US011925994B2

(12) United States Patent
Maeda

(10) Patent No.: US 11,925,994 B2
(45) Date of Patent: Mar. 12, 2024

(54) RING-SHAPED BAND SAW BLADE MANUFACTURING METHOD AND MANUFACTURING APPARATUS

(71) Applicants: Amada Co., Ltd., Kanagawa (JP); Amada Machinery Co., Ltd., Kanagawa (JP)

(72) Inventor: Kensaku Maeda, Kanagawa (JP)

(73) Assignees: AMADA CO., LTD., Kanagawa (JP); AMADA MACHINERY CO., LTD., Kanagawa (JP)

(*) Notice: Subject to any disclaimer, the term of this patent is extended or adjusted under 35 U.S.C. 154(b) by 0 days.

(21) Appl. No.: 18/109,911

(22) Filed: Feb. 15, 2023

(65) Prior Publication Data
US 2023/0191512 A1 Jun. 22, 2023

Related U.S. Application Data

(62) Division of application No. 16/972,720, filed as application No. PCT/JP2019/021910 on Jun. 3, 2019, now Pat. No. 11,607,739.

(30) Foreign Application Priority Data

Jun. 8, 2018 (JP) ................................. 2018-110240

(51) Int. Cl.
B23D 65/00 (2006.01)
B23P 15/28 (2006.01)
(Continued)

(52) U.S. Cl.
CPC .............. B23D 65/00 (2013.01); B23P 15/28 (2013.01); B23D 61/12 (2013.01);
(Continued)

(58) Field of Classification Search
CPC ................................. B23D 65/00; B23P 15/28
(Continued)

(56) References Cited

U.S. PATENT DOCUMENTS 3,034,379 A 6/1959 Bernstein et al.
3,315,548 A * 4/1967 Anderson et al. ..... B23D 65/00
76/112
(Continued)

FOREIGN PATENT DOCUMENTS

CN 104148739 A * 11/2014 ............. B23D 63/12
EP 0326325 A2 8/1989
(Continued)

OTHER PUBLICATIONS

Machine Translation for EP-3321020-B1 (Year: 2020).*
(Continued)

Primary Examiner — Jason Daniel Prone
(74) Attorney, Agent, or Firm — Renner, Otto, Boisselle & Sklar, LLP

(57) ABSTRACT

A manufacturing apparatus of a ring-shaped band saw blade for manufacturing the ring-shaped band saw blade including a tooth tip to which a hard cutting tip is joined. The manufacturing apparatus includes a rotatory moving section that provides rotatory movement of the ring-shaped band saw blade including a body part having a band shape and a tooth part including a plurality of teeth formed on one side part of the body part; a surface polishing section that polishes an inner surface and an outer surface of the body part in the ring-shaped band saw blade in the rotatory movement provided by the rotatory moving section; and an end face polishing section that polishes an end face of the body part on a side opposite to the tooth part in the ring-shaped band saw blade in the rotatory movement provided by the rotatory moving section.

3 Claims, 9 Drawing Sheets

(51) Int. Cl.
| | |
|---|---|
| B23D 61/12 | (2006.01) |
| B23K 11/00 | (2006.01) |
| B23K 11/087 | (2006.01) |
| B23K 11/16 | (2006.01) |
| B23K 31/02 | (2006.01) |
| B23K 101/20 | (2006.01) |
| B24B 3/36 | (2006.01) |

(52) U.S. Cl.
CPC ......... *B23K 11/0073* (2013.01); *B23K 11/087* (2013.01); *B23K 11/16* (2013.01); *B23K 31/025* (2013.01); *B23K 2101/20* (2018.08); *B24B 3/36* (2013.01)

(58) Field of Classification Search
USPC .......................................... 76/50.2, 50.4, 112
See application file for complete search history.

(56) References Cited

U.S. PATENT DOCUMENTS

| | | | | |
|---|---|---|---|---|
| 3,593,600 | A | | 7/1971 | Adams |
| 3,615,309 | A | * | 10/1971 | Dawson ................. B23D 65/00 451/540 |
| 3,730,024 | A | * | 5/1973 | Takigawa ............... B23D 65/00 76/112 |
| 3,763,721 | A | | 10/1973 | Funakubo |
| 3,766,808 | A | | 10/1973 | Cremisio et al. |
| 4,023,448 | A | * | 5/1977 | Bertini ................... B23D 65/00 76/112 |
| 4,369,685 | A | | 1/1983 | Trigg |
| 4,625,594 | A | | 12/1986 | Janke |
| 5,287,774 | A | * | 2/1994 | Seifert ................... B23D 65/00 76/112 |
| 5,417,777 | A | | 5/1995 | Henderer |
| 5,651,722 | A | * | 7/1997 | Werner ................. B23D 65/00 451/302 |
| 5,881,610 | A | | 3/1999 | Ashkenazi |
| 5,931,369 | A | | 8/1999 | Hellbergh |
| 6,363,827 | B1 | | 4/2002 | Osing et al. |
| 7,121,180 | B2 | | 10/2006 | Shimofurutani |
| 7,210,388 | B2 | | 5/2007 | Pacher et al. |
| 7,908,954 | B2 | | 3/2011 | Forsberg et al. |
| 10,821,531 | B2 | | 1/2020 | Yamashita |
| 11,607,739 | B2 | * | 3/2023 | Maeda .................... B23P 15/28 |
| 2004/0060396 | A1 | | 4/2004 | Tichler et al. |
| 2004/0237722 | A1 | * | 12/2004 | Ponemayr .............. B23D 65/00 76/112 |
| 2013/0133500 | A1 | | 5/2013 | Horiguchi |
| 2023/0158589 | A1 | * | 5/2023 | Masuda ................. B23D 65/00 76/112 |

FOREIGN PATENT DOCUMENTS

| | | | | |
|---|---|---|---|---|
| EP | 3321020 | B1 | * 4/2020 | ............ B23D 65/00 |
| EP | 3804894 | A1 | 4/2021 | |
| JP | 48-94490 | U | 11/1973 | |
| JP | S58-150453 | U | 10/1983 | |
| JP | 60-62409 | A | 4/1985 | |
| JP | 01091955 | A | * 4/1989 | ............ B23D 65/00 |
| JP | 1993-020822 | U | 3/1993 | |
| JP | H11-188527 | A | 7/1999 | |
| JP | 2012-035383 | A | 2/2012 | |
| JP | 2013-010170 | A | 1/2013 | |
| JP | 6578412 | B1 | 8/2019 | |
| JP | 2019209456 | A | 12/2019 | |
| WO | 2019235404 | A1 | 12/2019 | |
| WO | 2022030411 | A1 | 2/2022 | |

OTHER PUBLICATIONS

International Search Report for corresponding Application No. PCT/JP2019/021910, dated Aug. 6, 2019.
Written Opinion for corresponding Application No. PCT/JP2019/021910, dated Aug. 6, 2019.
Extended European Search Report for corresponding EP Application No. 19814179.8 dated Jul. 9, 2021.

\* cited by examiner

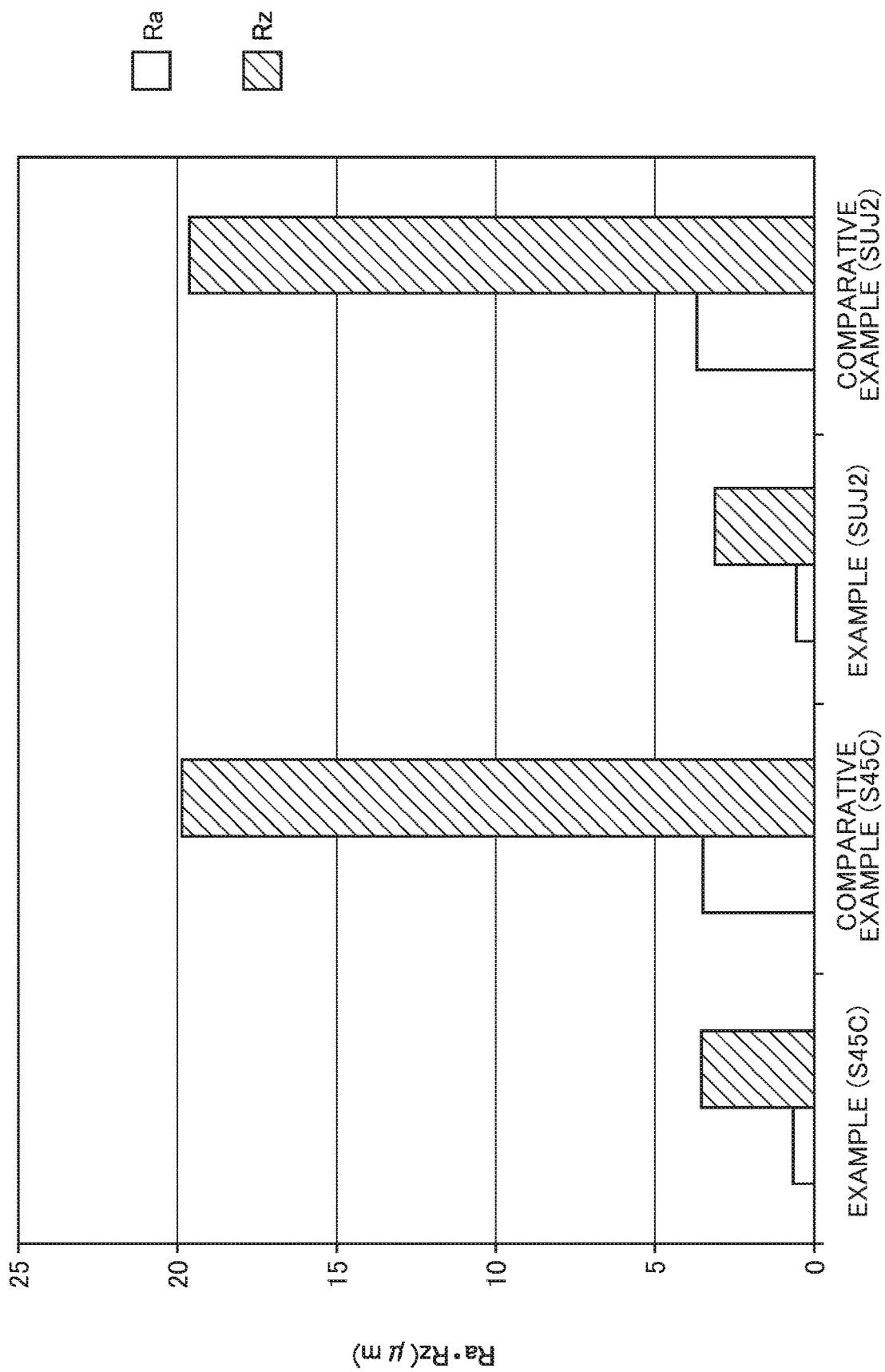

RING-SHAPED BAND SAW BLADE MANUFACTURING METHOD AND MANUFACTURING APPARATUS

This is a divisional application under 35 USC § 121 of U.S. patent application Ser. No. 16/972,720, now U.S. Pat. No. 11,607,739, filed Dec. 7, 2020, which is a national stage application under 35 USC § 371 of International Application No. PCT/JP2019/021910, filed Jun. 3, 2019, the entire disclosures of which are each incorporated herein by reference.

TECHNICAL FIELD

The present invention relates to a manufacturing method of a ring-shaped band saw blade and a manufacturing apparatus thereof.

BACKGROUND ART

Japanese Patent Laid-Open No. 2012-035383 (Patent Literature 1) illustrates a polishing method of a cutting tip in a band saw blade including a tooth tip provided with the cutting tip that is hard. Furthermore, Japanese Patent Laid-Open No. 2013-010170 (Patent Literature 2) illustrates a method of manufacturing an endless (ring-shaped) band saw blade obtained by joining opposite ends of a band saw blade by flash butt welding that is one type of resistance welding.

In a case of manufacturing the ring-shaped band saw blade by use of the band saw blade including the tooth tip provided with the hard cutting tip, in general, the following method is used. First, the cutting tip is joined to the tooth tip of the band saw blade having a predetermined length prior to the formation of the ring shape, by welding or the like. Next, the joined cutting tip is polished with a diamond grindstone to form a predetermined tooth tip shape. Afterward, the opposite ends of the band saw blade are joined by resistance welding, to form a ring-shaped band saw blade.

In this method, a polishing operation of the cutting tip is performed by use of the tooth tip and an end portion of a body part that is on a side opposite to the tooth tip as positioning references, in a state where one surface of the body part is pressed against a surface plate and the band saw blade is clamped with a vise.

However, in the body part, distortion due to thermal treatment during manufacturing of the band saw blade might occur in a band width direction and a thickness direction. Depending on a degree of this distortion, a problem occurs that shape accuracy of a plurality of tooth tips formed in the polishing operation decreases, or shape variation among the plurality of tooth tips increases.

In a case where such a ring-shaped band saw blade is for use in processing, there is concern that quality of a cut surface deteriorates.

Furthermore, bulging easily occurs in a joined part to form the ring-shape, due to the welding, and if the bulging occurs, the bulging portion is cut with a grinder or the like and is flattened. However, slight unevenness easily remains in a surface of the body part due to variation in cutting amount or the like. When the band saw blade including the joined part in which the unevenness remains is used in cutting, an orbiting tool mark is generated in a cut surface of a product, and there is concern that quality of the cut surface deteriorates.

Under these situations, a ring-shaped band saw blade from which satisfactory cut surface quality can be obtained is required.

SUMMARY

Technical Problem

According to the present invention, a manufacturing method of a ring-shaped band saw blade from which satisfactory cut surface quality can be obtained and a manufacturing apparatus thereof can be provided.

Solution to Problem

According to a technical aspect of the present invention, a manufacturing method of a ring-shaped band saw blade includes a ring forming step of welding opposite ends of a band saw blade including a body part having a band shape, and a tooth part including a plurality of teeth formed on one side part of the body part, to form a ring shape, a polishing step of polishing an inner surface, an outer surface, and an end face on a side opposite to the tooth part in the ring-shaped band saw blade, and a tip tooth tip forming step of positioning, after the polishing step, the ring-shaped band saw blade by use of one of the inner surface and the outer surface, and the end face as references, joining a cutting tip to tooth tips of the plurality of teeth by welding, and polishing the joined cutting tip to form a tooth tip shape.

According to another technical aspect of the present invention, a manufacturing apparatus of a ring-shaped band saw blade for manufacturing the ring-shaped band saw blade including a tooth tip to which a hard cutting tip is joined includes a rotatory moving section that provides rotatory movement of the ring-shaped band saw blade including a body part having a band shape and a tooth part including a plurality of teeth formed on one side part of the body part, a surface polishing section that polishes an inner surface and an outer surface of the body part in the ring-shaped band saw blade in the rotatory movement provided by the rotatory moving section, and an end face polishing section that polishes an end face of the body part on a side opposite to the tooth part in the ring-shaped band saw blade in the rotatory movement provided by the rotatory moving section.

BRIEF DESCRIPTION OF DRAWINGS

FIG. 6 illustrates areas to be polished FA1, FB1 in the ring-shaped band saw blade 1E in an initial stage of a polishing step, in which FIG. 6(a) shows an inner surface 14A, and FIG. 6(b) shows an outer surface 14B.

FIG. 7 illustrates state examples of polished areas FA2, FB2 in the ring-shaped band saw blade 1E subjected to the polishing step, in which FIG. 7(a) shows the inner surface 14A, and FIG. 7(b) shows the outer surface 14B.

FIG. 9 is a graph showing cut surface roughness of examples and comparative examples.

DESCRIPTION OF EMBODIMENTS

An example of a manufacturing method of a ring-shaped band saw blade according to an embodiment of the present invention will be described in accordance with a manufacturing procedure of a ring-shaped band saw blade 1E.

Figure 3:
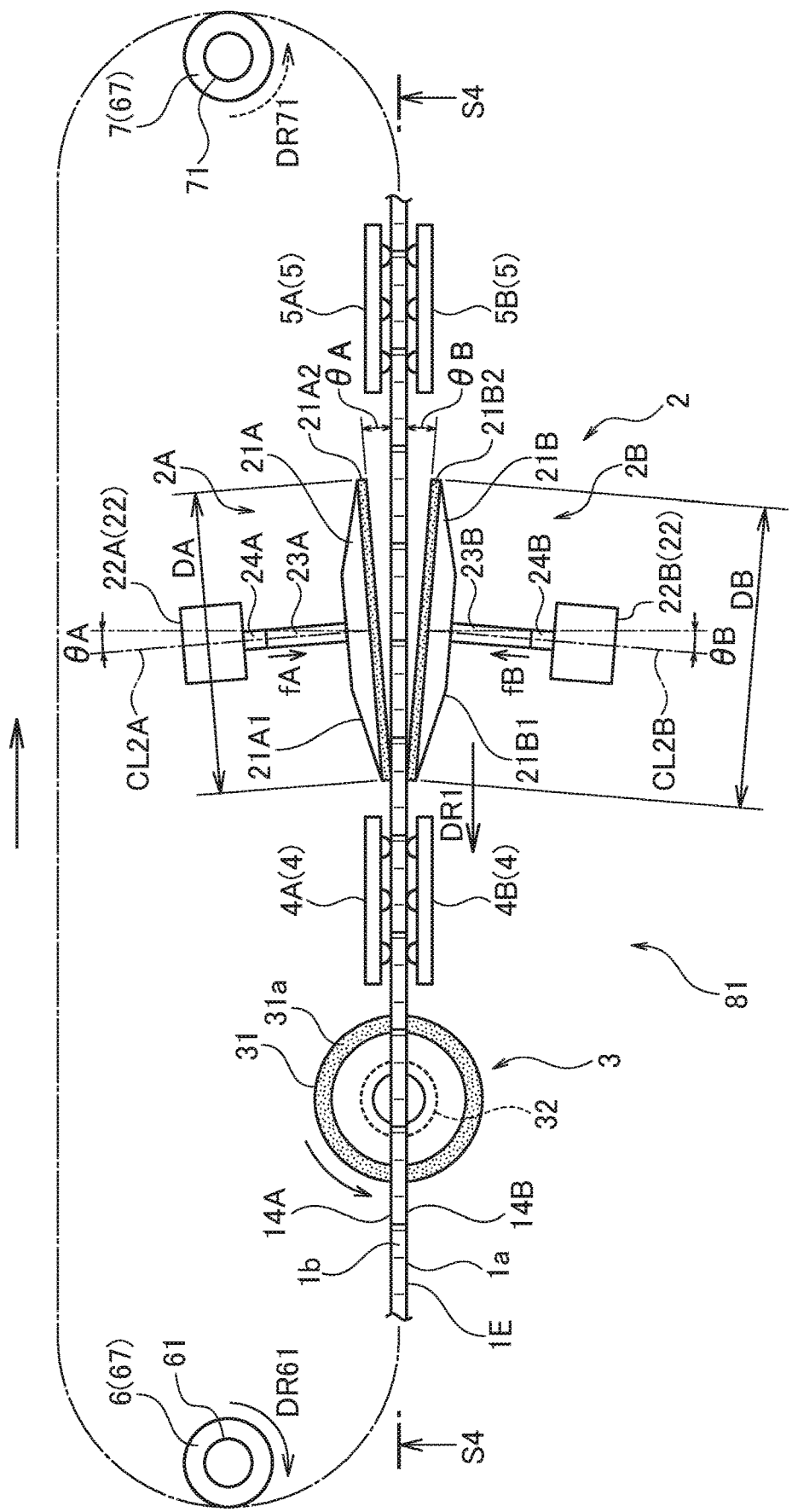
FIG. 3 is a plan view illustrating a polishing apparatus 81 that is an example of a manufacturing apparatus of the ring-shaped band saw blade according to the embodiment of the present invention.

In this manufacturing procedure, a polishing apparatus 81 illustrated in FIG. 3 is used which is an example of a manufacturing apparatus of the ring-shaped band saw blade according to the embodiment of the present invention.

The ring-shaped band saw blade 1E is a band saw blade that is formed in a ring shape and is capable of continuous rotatory moving by a general band saw machine. A band saw blade 1 prior to the formation of the ring shape includes a band-shaped body part 1a, and a tooth part 1b including a plurality of teeth formed on one side part of the body part 1a (FIG. 1).

Figure 1:
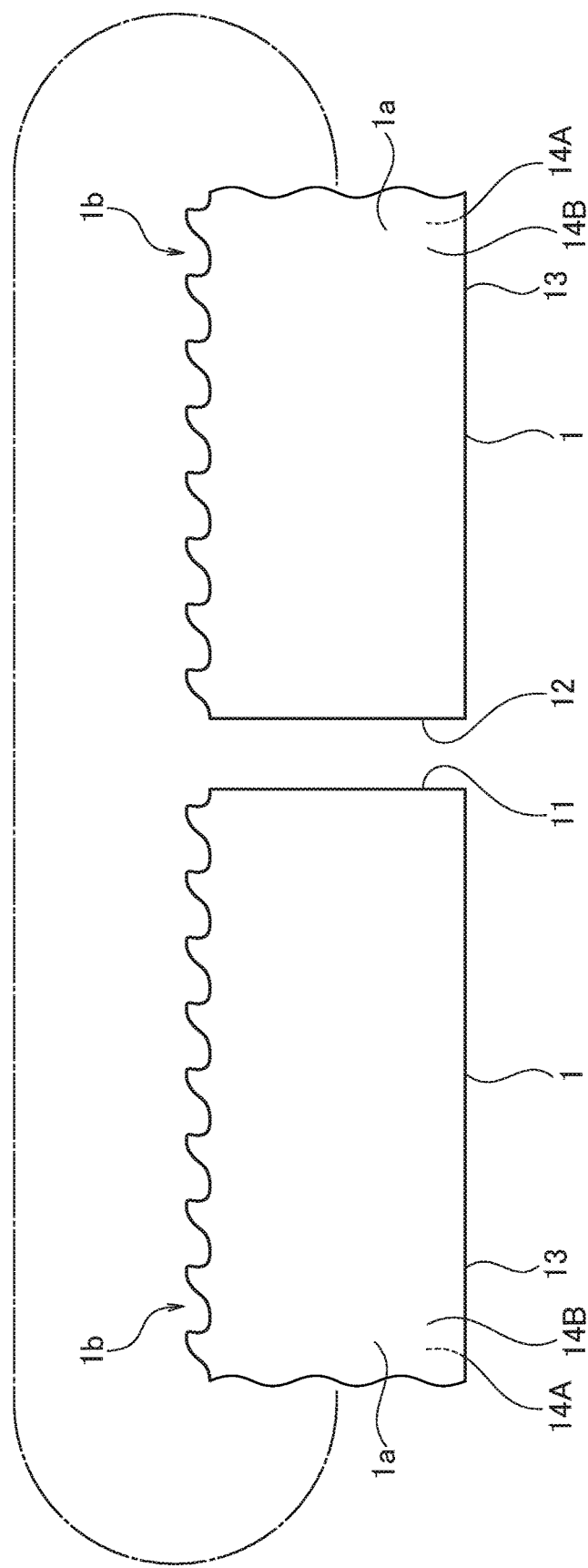
FIG. 1 is a first view illustrating a manufacturing procedure of a ring-shaped band saw blade 1E in an example of a manufacturing method of the ring-shaped band saw blade according to an embodiment of the present invention.

First, as illustrated in FIG. 1, the band-shaped band saw blade 1 including the body part 1a and the tooth part 1b is disposed in a ring shape so that one end 11 faces another end 12.

In this state, a surface of the body part 1a which forms an inner surface of a ring is referred to as an inner surface 14A, and an outer surface of the ring is referred to as an outer surface 14B. Furthermore, an end face of the body part 1a which is on a side opposite to the tooth part 1b is referred to as an end face 13.

A cutting tip 15 (see FIG. 8) is not joined to the band saw blade 1 yet.

(Ring Forming Step)

Figure 2:
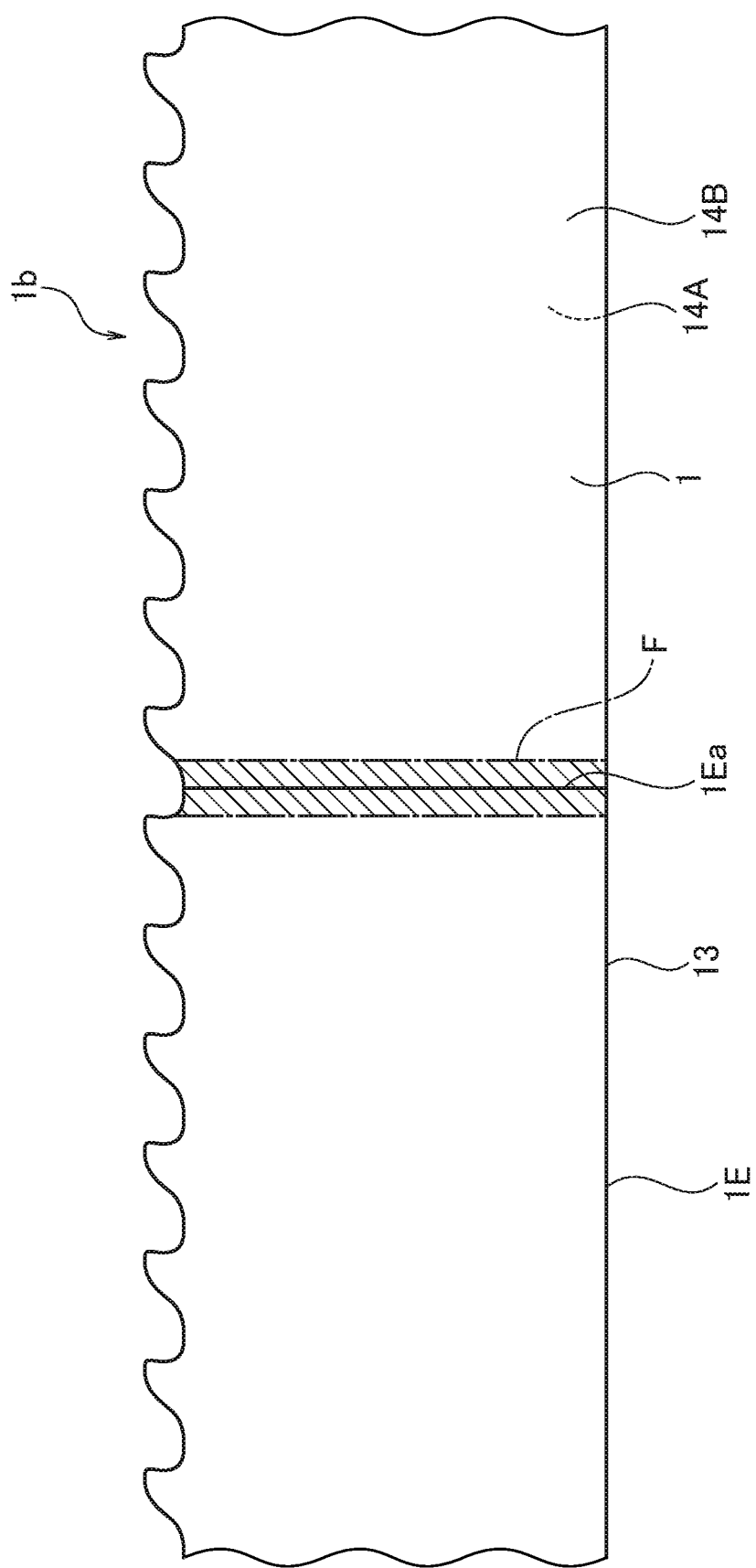
FIG. 2 is a second view illustrating the manufacturing procedure of the ring-shaped band saw blade 1E.

Next, as illustrated in FIG. 2, the end 11 is joined to the end 12 by welding, to form a ring shape. That is, the band saw blade 1 is formed into the ring-shaped band saw blade 1E. As a method of welding, a well-known method is used, such as resistance welding for use in the formation of the ring shape of the band saw blade.

In the ring-shaped band saw blade 1E, a part formed by joining the end 11 to the end 12 is referred to as a joined part 1Ea. In a vicinity of the joined part 1Ea, as shown by diagonal lines, a heat affected area F is formed in which distortion might occur by effect of heating due to the welding.

The ring-shaped band saw blade 1E is disposed over the polishing apparatus 81 as the manufacturing apparatus of the ring-shaped band saw blade illustrated in FIG. 3, so that a predetermined part is polished. The predetermined part includes the end face 13, the inner surface 14A and the outer surface 14B of the body part 1a.

Figure 4:
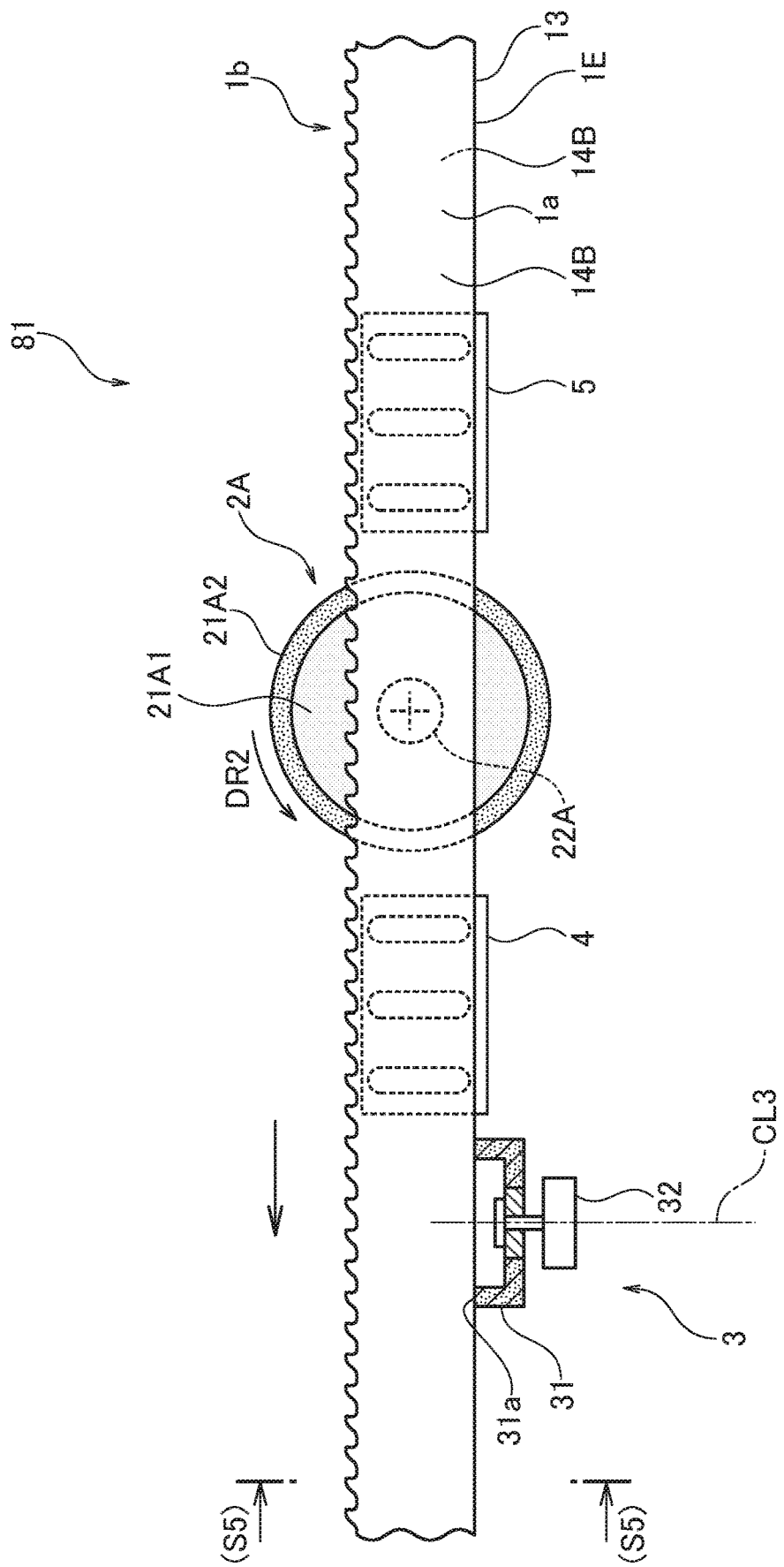
FIG. 4 is a cross-sectional view at an S4-S4 position in FIG. 3.
Figure 5:
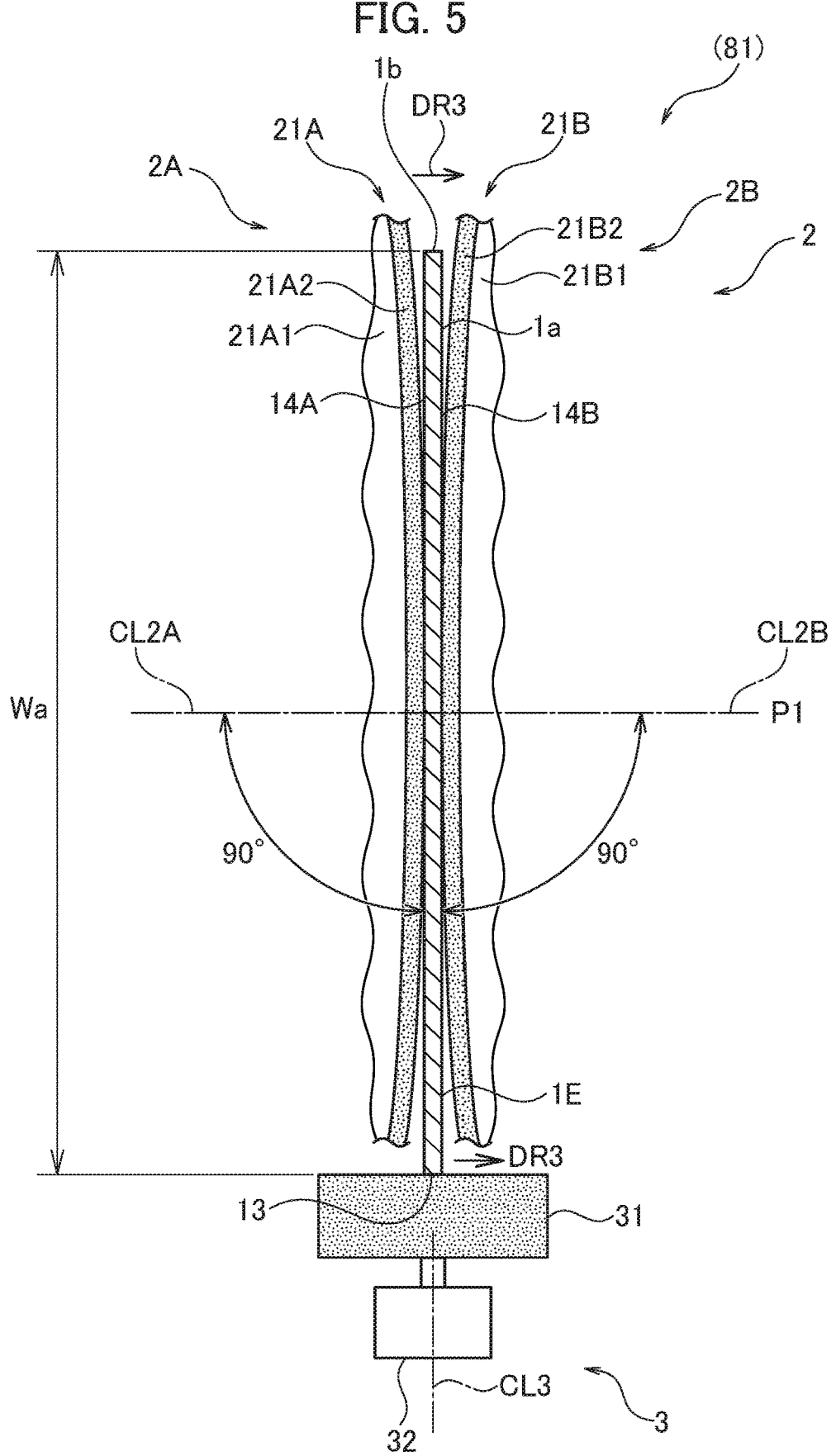
FIG. 5 is a view corresponding to a cross-sectional view at an S5-S5 position in FIG. 4 and illustrating a surface polishing section 2 and an end face polishing section 3 in the polishing apparatus 81.

Referring to FIG. 3 to FIG. 5, the polishing apparatus 81 will be described. The polishing apparatus 81 includes a drive wheel 6 and a driven wheel 7. The ring-shaped band saw blade 1E to be polished is disposed over the drive wheel 6 and the driven wheel 7 by an operator.

The drive wheel 6 includes a motor 61. The motor 61 rotates in a direction shown by an arrow DR61 in FIG. 3, and provides rotatory movement of the disposed ring-shaped band saw blade 1E in a clockwise direction of FIG. 3 (an arrow DR1).

The driven wheel 7 includes a back tension giving section 71. The back tension giving section 71 outputs a rotational driving force in a direction shown by a dashed arrow DR71 of FIG. 3.

Consequently, a predetermined back tension is given to the ring-shaped band saw blade 1E in the rotatory movement. In this way, a rotatory moving section 67 including the drive wheel 6 and the driven wheel 7 is formed to provide rotatory movement of the ring-shaped band saw blade 1E.

The polishing apparatus 81 includes an upstream guide section 5, a surface polishing section 2, a downstream guide section 4, and an end face polishing section 3 in order from an upstream side in a rotatory moving path of the ring-shaped band saw blade 1E.

The upstream guide section 5 and the downstream guide section 4 have the same structure, and are disposed in vicinities of the upstream side and a downstream side of the surface polishing section 2, respectively. The upstream guide section 5 includes an inner guide section 5A that guides the inner surface 14A and an outer guide section 5B that guides the outer surface 14B, to hold the ring-shaped band saw blade 1E in the rotatory movement in a thickness direction. The downstream guide section 4 includes an inner guide section 4A that guides the inner surface 14A and an outer guide section 4B that guides the outer surface 14B, to hold the ring-shaped band saw blade 1E in the rotatory movement in the thickness direction.

Consequently, vibration in the thickness direction, while the ring-shaped band saw blade 1E passes through the surface polishing section 2 during the rotatory movement, can be suppressed to a substantially negligible level.

The surface polishing section 2 includes an inner polishing section 2A disposed in correspondence with the inner surface 14A of the ring-shaped band saw blade 1E to polish the inner surface 14A, and an outer polishing section 2B disposed in correspondence with the outer surface 14B to polish the outer surface 14B.

The inner polishing section 2A includes a grindstone 21A, a shaft 23A, and a motor 22A. The outer polishing section 2B includes a grindstone 21B, a shaft 23B, and a motor 22B.

That is, the surface polishing section 2 includes a pair of grindstones 21A, 21B.

The grindstone 21A includes a plate-shaped base 21A1 and a round grindstone 21A2 attached to a peripheral edge of the base. The round grindstone 21A2 possesses, for example, a ring shape.

A rotation axis CL2A of the grindstone 21A is inclined by an inclination angle RA on a front side (the downstream side) in a rotatory moving direction to the inner surface 14A of the ring-shaped band saw blade 1E, and is orthogonal to a width direction (see FIG. 5).

The grindstone 21A is fixed to a tip of the shaft 23A extending along the rotation axis CL2A with a posture orthogonal to the rotation axis CL2A. The shaft 23A is connected to an output shaft of the motor 22A via a pressing section 24A in a rotatable manner. The pressing section 24A presses the shaft 23A with action of a compression spring or the like so that the grindstone 21A is pressed with an urging force fA to abut on the inner surface 14A.

The motor 22A drives and rotates the grindstone 21A while the round grindstone 21A2 is in contact with the inner surface 14A. A rotating direction of the motor 22A is a direction in which the grindstone 21A on the front side in the rotatory moving direction is oriented downward (in a counterclockwise direction in FIG. 4, see an arrow DR2), that is, from the tooth part 1b toward the end face 13. This direction is a polishing direction.

Consequently, a tip portion of the round grindstone 21A2 on the front side in the rotatory moving direction of the ring-shaped band saw blade 1E polishes the inner surface 14A while pressing the inner surface 14A with the predetermined urging force fA.

The grindstone 21B includes a plate-shaped base 21B1 and a round grindstone 21B2 attached to a peripheral edge of the base. The round grindstone 21B2 possesses, for example, a ring shape. A rotation axis CL2B of the grindstone 21B is inclined by an inclination angle θB on the front side (the downstream side) in a moving direction that is a band direction, to the outer surface 14B of the ring-shaped band saw blade 1E, and is orthogonal to the width direction (see FIG. 5).

The grindstone 21B is fixed to a tip of the shaft 23B extending along the rotation axis CL2B with a posture orthogonal to the rotation axis CL2B. The shaft 23B is connected to an output shaft of the motor 22B via a pressing section 24B in a rotatable manner. The pressing section 24B presses the shaft 23B so that the grindstone 21B is pressed with an urging force fB to abut on the outer surface 14B.

The motor 22B drives and rotates the grindstone 21B while the round grindstone 21B2 is in contact with the outer surface 14B. A rotating direction of the motor 22B is a direction in which the grindstone 21B on the front side in the rotatory moving direction is oriented downward (synchronously with the grindstone 21A), that is, from the tooth part 1b toward the end face 13. This direction is the polishing direction.

Consequently, the tip portion of the round grindstone 21B2 on the front side in the rotatory moving direction of the ring-shaped band saw blade 1E polishes the outer surface 14B while pressing the outer surface 14B with the predetermined urging force fB.

As illustrated in FIG. 5, the rotation axis CL2A and the rotation axis CL2B are present at the same position in the width direction of the ring-shaped band saw blade 1E (an up-down direction of FIG. 5), and are set to a central position of an overall width Wa obtained by adding widths of the body part 1a and tooth part 1b of the ring-shaped band saw blade 1E.

The end face polishing section 3 is disposed on one of the front side and a rear side in the rotatory moving direction of the ring-shaped band saw blade 1E with respect to the surface polishing section 2.

In this example, the end face polishing section 3 is disposed to face the end face 13 on the side opposite to the tooth part 1b of the ring-shaped band saw blade 1E, on the downstream side (the front side) of the downstream guide section 4. The end face polishing section 3 includes a cup grindstone 31 having a cup shape, and a motor 32.

The motor 32 rotates the cup grindstone 31 in an arbitrary direction about a rotation axis CL3. The rotation axis CL3 extends in an orthogonal direction to the end face 13 of the ring-shaped band saw blade 1E.

The polishing apparatus 81 including the above described configuration polishes the inner surface 14A and the outer surface 14B of the ring-shaped band saw blade 1E with the surface polishing section 2, and polishes the end face 13 of the ring-shaped band saw blade 1E with the end face polishing section 3.

Each polishing step will be specifically described.

The operator disposes, over the drive wheel 6 and the driven wheel 7, the ring-shaped band saw blade 1E formed in the ring shape by joining the opposite ends of the band saw blade 1 to each other. In this case, the ring-shaped band saw blade 1E is passed through spaces between the inner guide section 5A and the outer guide section 5B in the upstream guide section 5, between the grindstone 21A and the grindstone 21B in the surface polishing section 2, and between the inner guide section 4A and the outer guide section 4B in the downstream guide section 4.

In the polishing apparatus 81, in a state where the ring-shaped band saw blade 1E is disposed over the drive wheel 6 and the driven wheel 7, the end face 13 of the ring-shaped band saw blade 1E is in contact with a circular tip face 31a of the cup grindstone 31.

The operator drives the motor 61 to rotate the drive wheel 6, which provides rotatory movement of the ring-shaped band saw blade 1E in the arrow DR1 direction of FIG. 3. Upon driving the motor 61, the back tension giving section 71 is also operated, and the predetermined back tension is given to the ring-shaped band saw blade 1E. Consequently, the rotatory movement of the ring-shaped band saw blade 1E is stable in an appropriately tensioned state.

The operator drives the motors 22A, 22B, and 32. Consequently, the round grindstones 21A2, 21B2 and the cup grindstone 31 rotate, to polish the inner surface 14A, the outer surface 14B, and the end face 13, respectively.

As described above, the rotating direction of the round grindstones 21A2, 21B2 is set so that a tip side in a proceeding direction is oriented downward (the arrow DR2) in FIG. 4. Consequently, a downward force is given to the ring-shaped band saw blade 1E in the surface polishing section 2. Therefore, in the end face polishing section 3 on the downstream side of the surface polishing section 2, the end face 13 stably urges the cup grindstone 31. In consequence, the end face 13 is reliably and satisfactorily polished with the cup grindstone 31.

Furthermore, since the cup grindstone 31 rotates, the tip face 31a of the cup grindstone 31 is evenly used in polishing the end face 13. Consequently, wear on the cup grindstone 31 is averaged without being biased in a circumferential direction. Therefore, an amount of the end face 13 to be polished is uniformized per cycle, and the end face 13 is satisfactorily polished.

Polished areas in the inner surface 14A and outer surface 14B of the ring-shaped band saw blade 1E, which are areas polished by the surface polishing section 2, change with a polishing time, and expand in the width direction. This change will be described with reference to FIG. 6(a), FIG. 6(b), FIG. 7(a), and FIG. 7(b).

Furthermore, also in a case where bulging occurs in the heat affected area F in the vicinity of the joined part 1Ea joined to form the ring shape, the area is polished by the surface polishing section 2, and the bulging portion is removed and flattened.

Figure 6:
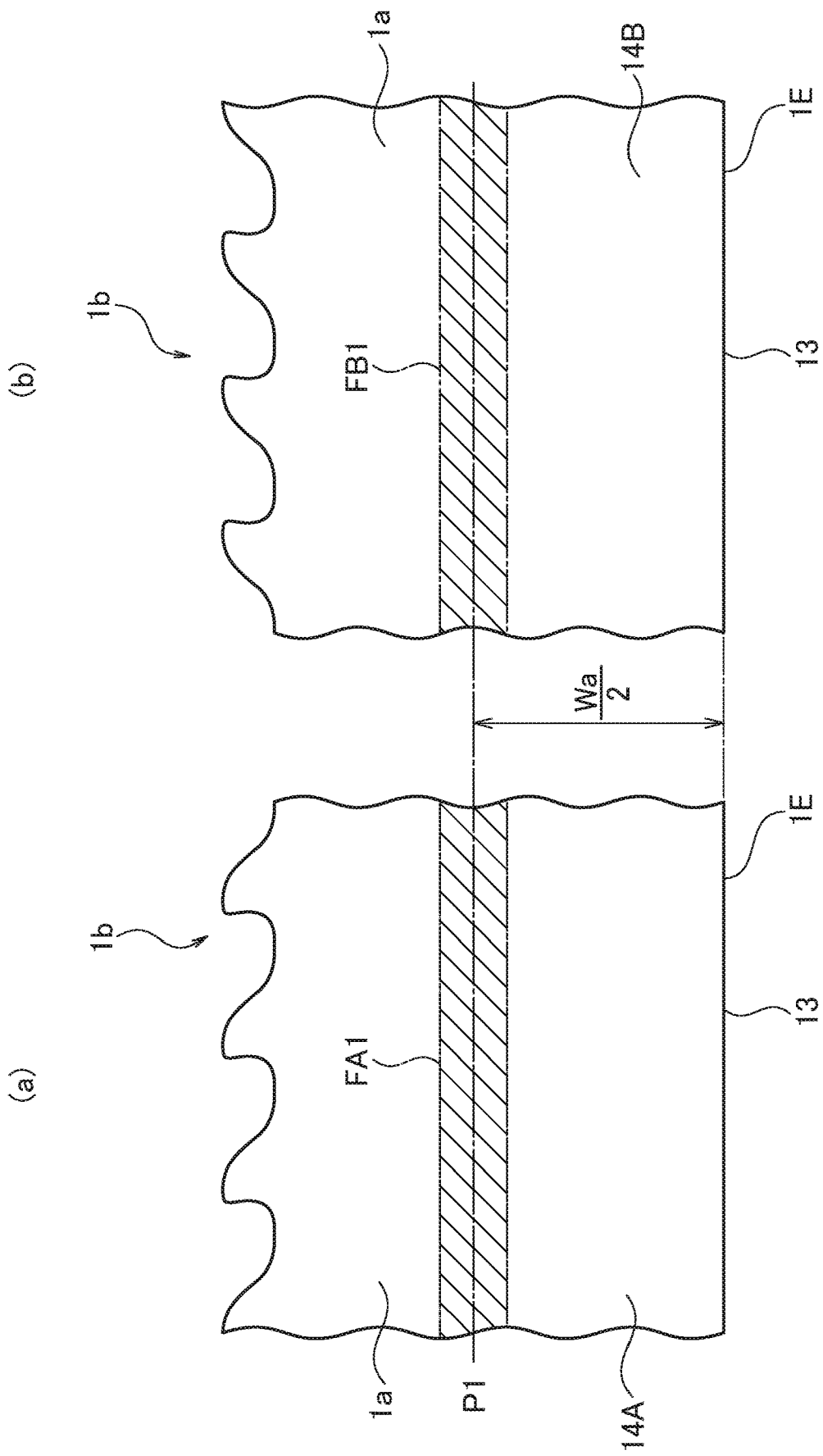

FIG. 6(a) and FIG. 6(b) show area to be polished FA1, and polished area FA2 in the inner surface 14A and the outer surface 14B in an initial stage after start of polishing, in diagonal line ranges, respectively. That is, each of the area to be polished FA1, and the polished area FA2 is formed around a height position P1 of a half (Wa/2) of the overall width Wa from the end face 13 toward the tooth part 1b so that only a downstream side tip portion of each of the grindstones 21A, 21B abuts on and polish the area in the initial stage after the start of the polishing.

As the polishing proceeds in accordance with the rotatory movement of the ring-shaped band saw blade 1E and the urging and abutment of the round grindstones 21A2, 21B2, the areas to be polished FA1, FB1 expand at about the same pace on a tooth part 1b side and the side opposite to the tooth part.

A polishing depth (the amount to be polished) is from 0.02 to 0.03 mm in a central portion of the body part 1a in the width direction. For example, in a case where a thickness of the body part 1a is from 1.60 mm to 1.61 mm prior to the polishing, a thickness of the central portion in the width direction is about 1.58 mm.

In a case where the amount of the central portion to be polished in the width direction is from 0.02 to 0.03 mm, the following items are set in advance so that almost all the inner surface 14A and outer surface 14B are polished not a little. Specifically, the inclination angles θA, θB, diameters DA, DB of the round grindstones 21A2, 21B2 (FIG. 3), rotational speeds VA, VB, and the like are adjusted and set in advance as illustrated below.

The diameter DA is set to 150 mm, and the diameter DB is set to 150 mm.
The rotational speed VA is set to 1500 rotations/minute, and the rotational speed VB is set to 1500 rotations/minute.
The inclination angle θA is set to about 0.8° (from 0.5° to 1.0°), and the inclination angle θB is set to about 0.8° (from 0.5° to 1.0°).

The ring-shaped band saw blade 1E has a thickness that is comparatively smaller than the overall width Wa, and the thickness is in general from about 3 to 5% of the overall width Wa. Consequently, as the polishing proceeds and the round grindstones 21A2, 21B2 bite into the ring-shaped band saw blade 1E in the thickness direction, edge portions on the tooth part 1b side and on the side opposite to the tooth part may be curved toward one of the round grindstones 21A2, 21B2 as shown by an arrow DR3 in FIG. 5.

Figure 7:
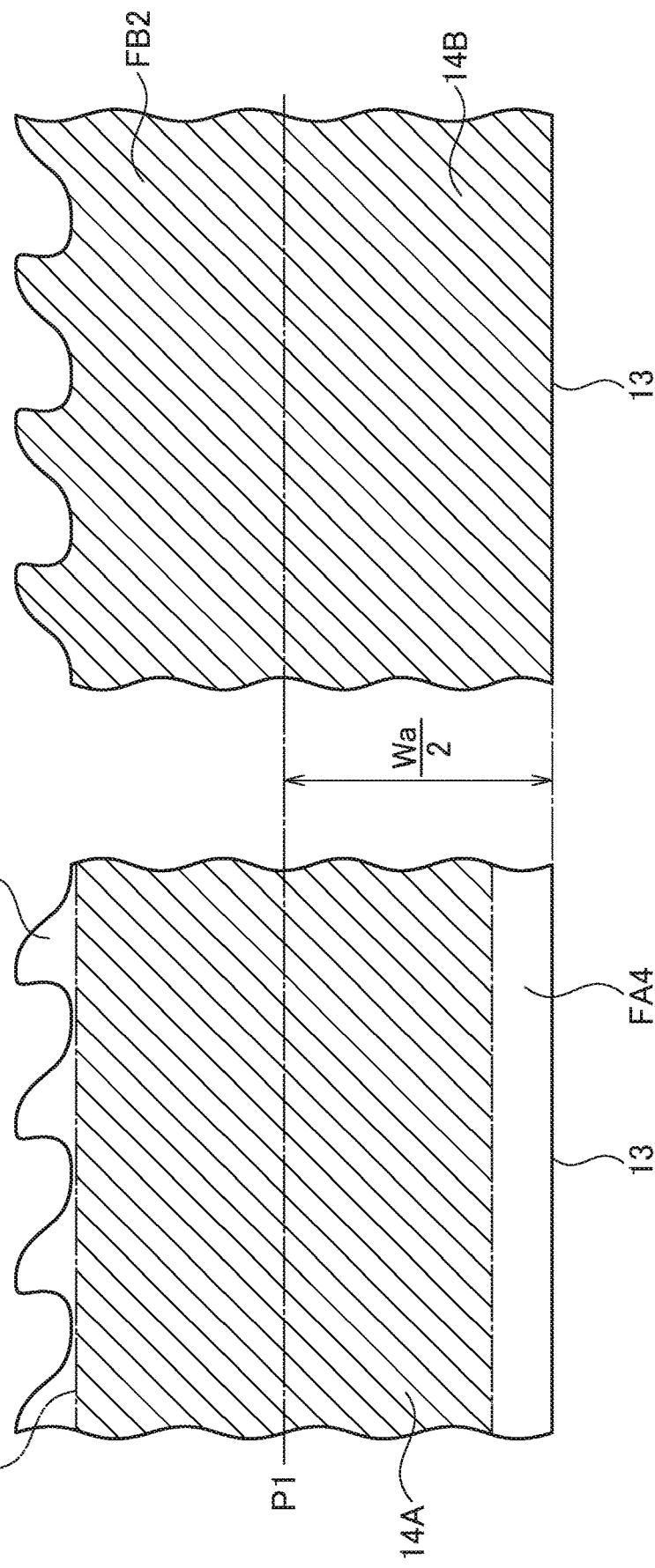

In this case, FIG. 7(a) and FIG. 7(b) show polished areas FA2, FB2 at end of the polishing, respectively. Here, a case where the ring-shaped band saw blade 1E is curved and polished on a side of the round grindstone 21B2 that polishes the outer surface 14B. That is, almost the whole outer surface 14B including the tooth part 1b is polished with the round grindstone 21B2 on a curvature central side of a curve.

On the other hand, on a side opposite to a curvature center of the curve, an area on the tooth part 1b side in the width direction and opposite edge areas on an end face 13 side do not come in contact with the round grindstone 21A2, and form non-polished areas FA3, FA4 that are slight unpolished areas. Certainly, no curve may be generated, and in this case, both the inner surface 14A and the outer surface 14B entirely form the polished area FA2 and the polished area FB2, respectively.

(Tip Tooth Tip Forming Step)

Figure 8:
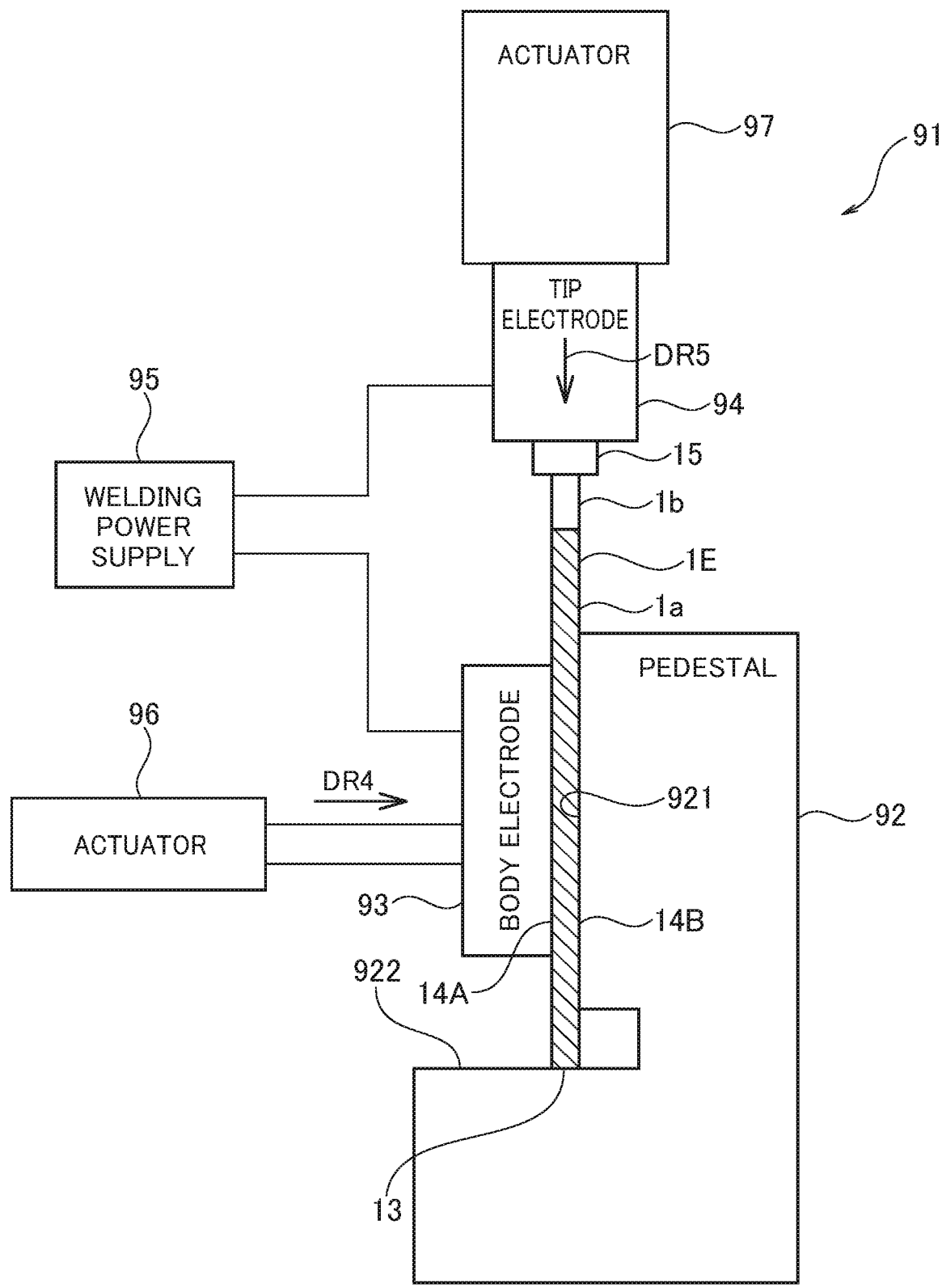
FIG. 8 is a functional configuration diagram illustrates a state of an operation of joining a cutting tip 15 to a tooth part 1b by a tip joining apparatus 91 after the polishing step is performed.

A cutting tip 15 is joined, by a tip joining apparatus 91, to the ring-shaped band saw blade 1E polished by the polishing apparatus 81. FIG. 8 is a functional configuration diagram illustrated the tip joining apparatus 91. The cutting tip 15 is made of a hard material such as cemented carbide.

The tip joining apparatus 91 is a resistance welding apparatus, and includes a pedestal 92, a body electrode 93, a tip electrode 94, a welding power supply 95 and actuators 96, 97. In the pedestal 92, the ring-shaped band saw blade 1E is positioned and supported with a body receiving section 921 and an end face receiving section 922.

Specifically, the operator urges the polished area FA2 of the inner surface 14A of the body part 1a of the ring-shaped band saw blade 1E or the polished area FB2 of the outer surface 14B so that the area abuts on the body receiving section 921. The operator urges the end face 13 of the body part 1a of the ring-shaped band saw blade 1E so that the end face abuts on the end face receiving section 922.

The body electrode 93 is urged by the actuator 96 to abut on the inner surface 14A of the body part 1a of the ring-shaped band saw blade 1E, and the body part 1a is pressed onto the body receiving section 921 of the pedestal 92 (an arrow DR4).

The tip electrode 94 is urged by the actuator 97 to abut on the cutting tip 15 mounted on a tip portion of the tooth part 1b of the ring-shaped band saw blade 1E, and the cutting tip 15 is pressed onto the tooth part 1b.

The body electrode 93 and the tip electrode 94 are connected to the welding power supply 95. The welding power supply energizes across the body electrode 93 and the tip electrode 94 with a welding current having a predetermined value for a predetermined time. Then, a contact portion between the tip electrode 94 and a tip of the tooth part 1b melts by resistance heat, and cools to solidify after stop of the energization. Consequently, the tip electrode 94 is joined to the tooth part 1b.

Afterward, the body electrode 93 and the tip electrode 94 are arranged away from each other, and the joined cutting tip 15 is polished with a diamond grindstone and formed into a predetermined blade tip shape.

In this joining operation and an operation of forming a tooth tip shape of the joined cutting tip 15, for the ring-shaped band saw blade 1E, the end face 13 and the outer surface 14B polished over an entire circumference of the ring shape by the polishing apparatus 81 are used as reference regions for the positioning.

Therefore, positions of a plurality of tooth tips of the positioned tooth part 1b are stably determined with high accuracy, and hence the tooth tip shape of the cutting tip 15 formed in the polishing operation is accurately formed. Furthermore, variability in shape of all the tooth tips in the ring-shaped band saw blade 1E is reduced.

Furthermore, the whole surface of one of the inner surface 14A and the outer surface 14B of the body part 1a of the ring-shaped band saw blade 1E and substantially the whole surface of the other are polished by the polishing apparatus 81. Consequently, surface unevenness is suppressed to a substantially negligible level over the entire circumference of the ring shape.

Therefore, in a case where the ring-shaped band saw blade 1E manufactured by using the polishing apparatus 81 is used in cutting, any orbiting tool marks are not generated in a cut surface of a product, and quality deterioration of the cut surface does not occur.

FIG. 9 is a graph showing cut surface roughness in a case where two types of materials described below are cut by a general band saw machine, by use of the ring-shaped band saw blade 1E manufactured by the above described example method, and a ring-shaped band saw blade 1EP manufactured by an associated method as a comparative example. The cut surface roughness is evaluated in terms of Ra (arithmetic mean roughness) and Rz (maximum height roughness).

In the associated method as the comparative example, joining of a cutting tip, forming of a tooth tip of the cutting tip, joining for ring-shape and removal of the bulging portion of a joined part by a grinder are performed in this order.

The cut materials are the following two types of material A and material B.

The material A is a round bar material made of S45C (carbon steel for a machine structure) and having a diameter of 50 mm.

The material B is a round bar material made of SUJ2 (high carbon chrome bearing steel) and having a diameter of 70 mm.

Cutting conditions are common with the material A and the material B as follows.

A sawing velocity is 200 m/min.

A cutting time is four seconds.

The cut surface roughness is measured by using a surface roughness measuring instrument "SJ-210" manufactured by Mitutoyo Corporation, and indicates average values of Ra and Rz at three points of the cut surface at a cutting start vicinity position, a cutting intermediate position (a center of a round bar) and a cutting end vicinity position.

As illustrated in FIG. 9, as for Ra, materials of S45C and SUJ2 indicate values of 3.53 (μm) and 3.77 (μm), respectively, in a conventional technology, but the values decrease to 0.64 (μm) and 0.62 (μm), respectively, in the example.

As for Rz, the materials S45C and SUJ2 indicate values of 19.82 (μm) and 19.69 (μm), respectively, in the conventional technology, but the values decrease to 3.53 (μm) and 3.19 (μm), respectively, in the example.

Furthermore, in visual observation of the cut surface, a slight tool mark is confirmed in the comparative example, while any tool marks cannot be confirmed in the example.

That is, it is clear that by the manufacturing method of the endless band saw blade of the example, the surface roughness of the cut surface can be decreased more than in the conventional technology, the generation of the tool mark can be prevented, and satisfactory cut surface quality can be obtained.

In the surface polishing section 2 of the polishing apparatus 81, the inner surface 14A and the outer surface 14B of the ring-shaped band saw blade 1E are polished with the round grindstone 21A2 and the round grindstone 21B2, respectively.

In the polishing apparatus 81, during the polishing operation, the round grindstone 21A2 and the round grindstone 21B2 are rotated about the rotation axis CL2A and the rotation axis CL2B that are set to be non-orthogonal to the inner surface 14A and the outer surface 14B, respectively. The rotating direction is set so that a polishing direction is oriented from the tooth part 1b toward the end face 13.

Consequently, in the initial stage of the polishing operation, small parts of circumferential edges of the round grindstone 21A2 and the round grindstone 21B2 urge and abut on the inner surface 14A and the outer surface 14B, respectively. Therefore, an area of a part of the ring-shaped band saw blade 1E in the width direction is polished into a thin band shape as each of the areas to be polished FA1, FB1. As the polishing operation proceeds, widths of the area to be polished FA1 and the area to be polished FB1 expand. Therefore, the operator can visually grasp a proceeding degree of polishing.

Furthermore, each of the rotation axis CL2A and the rotation axis CL2B is set to a generally central position of the ring-shaped band saw blade 1E in the width direction, and hence the area to be polished FA1 and the area to be polished FB1 evenly expand to the tooth part 1b side and the end face 13 side without being biased. Consequently, there is only small possibility that the area to be polished FA1 and the area to be polished FB1 are excessively polished initially during the polishing to polish the whole surfaces.

Additionally, since the rotating direction is set as described above, the end face 13 is urged to abut on the cup grindstone 31 of the end face polishing section 3, and hence the end face 13 can be stably satisfactorily polished.

The example of the present invention is not limited to the above described configuration and procedure, and may be a modification without departing from the scope of the present invention.

Prior to the formation of the ring shape of the band saw blade 1, the cutting tip 15 may be joined as follows to form the tooth tip, and then the ring shape may be formed.

A procedure example in this case is as follows.

First, in a state of the band-shaped band saw blade 1 prior to the formation of the ring shape, both the surfaces of the body part 1a and the end face 13 on the side opposite to the tooth part 1b are polished (first polishing). Next, by use of one of both the polished surfaces, and the end face 13 as references, the cutting tip 15 is welded and joined, and the tooth tip shape is formed. Subsequently, the one end 11 and the other end 12 of the band saw blade 1 to which the cutting tip 15 is joined are welded and joined to form the ring-shaped band saw blade 1E. Afterward, both the surfaces of the ring-shaped body part and the end face 13 on the side opposite to the tooth part are polished (second polishing).

In this case, two polishing steps are required, but prior to the joining of the cutting tip 15 to the tooth part 1b and shape forming, both the surfaces of the body part 1a and the end face 13 are polished as the first polishing, and after the formation of the ring shape, the polishing is performed to flatten the unevenness of the joined part 1Ea as the second polishing. Consequently, the tooth tip shape of the cutting tip 15 is accurately formed without any variations, and the state where there is substantially no unevenness of the joined part 1Ea can be obtained. Therefore, satisfactory cut surface quality can be obtained.

A structure of the pressing sections 24A, 24B to urge the round grindstones 21A2, 21B2 onto the ring-shaped band saw blade 1E is not limited, and a well-known urging structure can be applied. The polishing apparatus 81 may include a motor controller, and the motor controller may control the rotation of the motor 22A and the motor 22B in a reverse direction at a synchronous speed. The motors 22A, 22B may be combined into one motor as a drive source, and a force transmission path may be separated to two systems.

The round grindstones 21A2, 21B2 provided in the grindstones 21A, 21B are not limited to the ring shape as long as an outer shape is round. For example, a disk-shaped flat grindstone may be provided. The rotation axes CL2A, CL2B of the grindstones 21A, 21B do not necessarily have to be located in the center of the ring-shaped band saw blade 1E in the width direction, and may be set to a position that is biased to the tooth part 1b side or the end face 13 side.

As described in the example, the rotation axes CL2A, CL2B are inclined in the rotatory moving direction at the center in the width direction, so that the proceeding degree of the polishing can be grasped from an expansion degree of the area to be polished FA1, and the polished area FA2 in the width direction.

As described above, according to the present invention, the present invention is effective in that satisfactory cut surface quality can be obtained.

(U.S. Designation)

This international patent application is related to the U.S. designation, and claims the benefit of priority based on Article 119(a) of U.S. patent law from Japanese Patent Application No. 2018-110240 filed on Jun. 8, 2018, the entire content of which disclosure is incorporated herein by reference.

The invention claimed is:

1. A manufacturing apparatus of a ring-shaped band saw blade for manufacturing the ring-shaped band saw blade including tips of teeth to which hard cutting tips are joined, the manufacturing apparatus comprising:
- a rotatory moving section that provides rotatory movement of the ring-shaped band saw blade including a body part having a band shape and a tooth part including the tips of teeth formed on one side part of the body part;
- a surface polishing section that polishes an inner surface and an outer surface of the body part in the ring-shaped band saw blade while the rotatory moving section provides rotary movement of the ring-shaped saw blade;
- an end face polishing section that polishes an end face of the body part on a side opposite to the tooth part in the ring-shaped band saw blade while the rotatory moving section provides rotary movement of the ring-shaped saw blade, wherein the polished inner surface, the polished outer surface, and the polished end face of the body part form positional references; and
- a tip joining apparatus configured to position the ring-shaped band saw blade by use of one of the positional references, join a cutting tip to one or more tips of the tips of teeth by welding, and polish the joined cutting tip to form a tooth tip shape.

2. The manufacturing apparatus of the ring-shaped band saw blade according to claim 1, wherein the surface polishing section includes a pair of rotatable round grindstones disposed in correspondence with the inner surface and the outer surface, respectively, and
- the pair of round grindstones abut on and polish, while rotating, the inner surface and the outer surface, respectively, in the ring-shaped band saw blade in the rotatory movement.

3. The manufacturing apparatus of the ring-shaped band saw blade according to claim 2, wherein while the rotatory moving section provides rotary movement of the ring-shaped saw blade in a rear side to a front side direction, the end face polishing section is disposed on one of the front side and the rear side,
- a rotation axis of each of the pair of round grindstones is inclined toward the one of the front side and the rear side and is positioned in a center of the body part in a width direction of the body part, and
- a rotating direction of each of the pair of round grindstones is set so that the round grindstones rotate in a polishing direction from the tooth part toward the end face in the width direction of the body part.

* * * * *